Aug. 31, 1937. C. H. THUMA 2,091,695
DEVICE FOR TRANSPORTING LIVE FISH
Filed Feb. 1, 1935 5 Sheets-Sheet 2
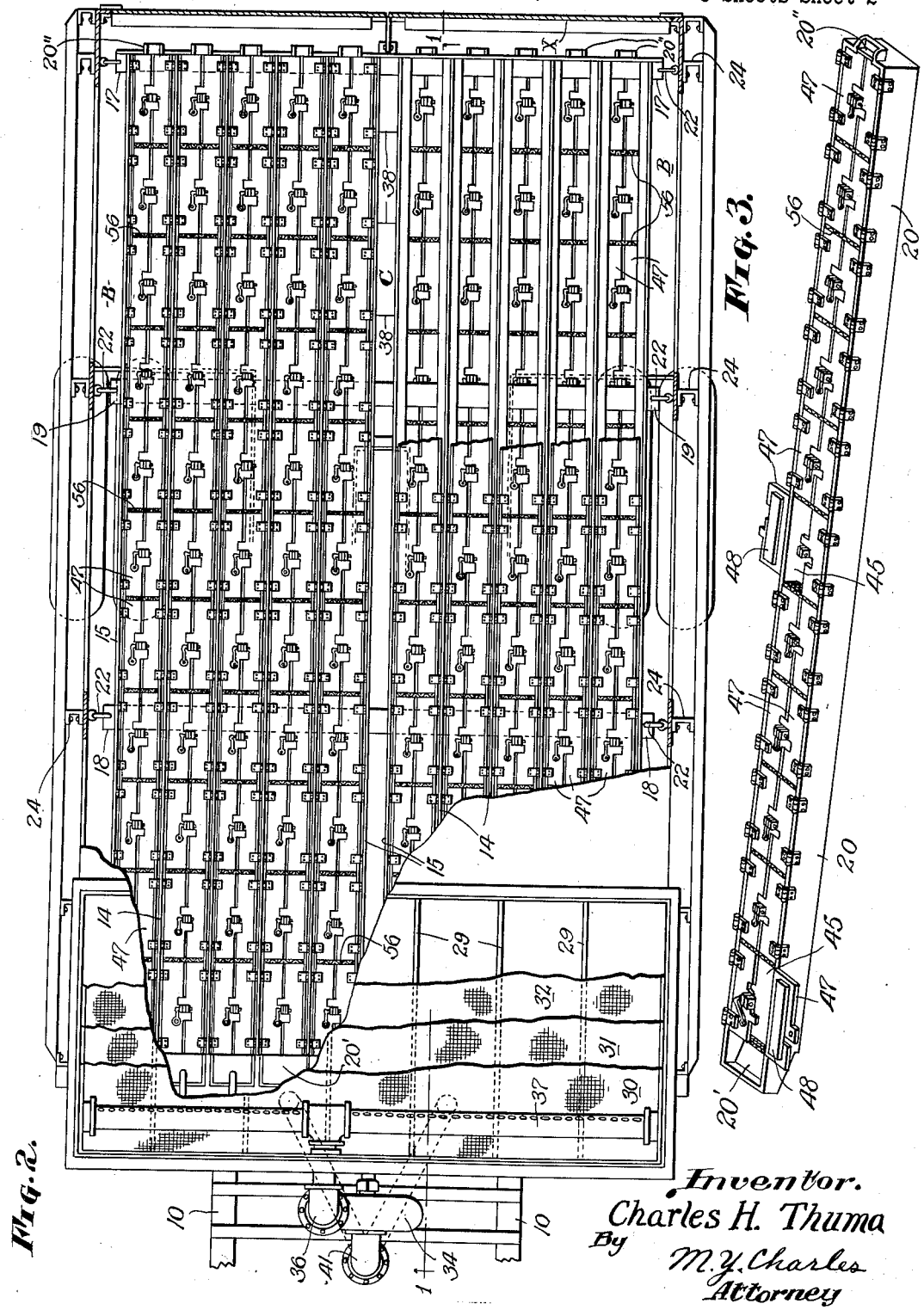

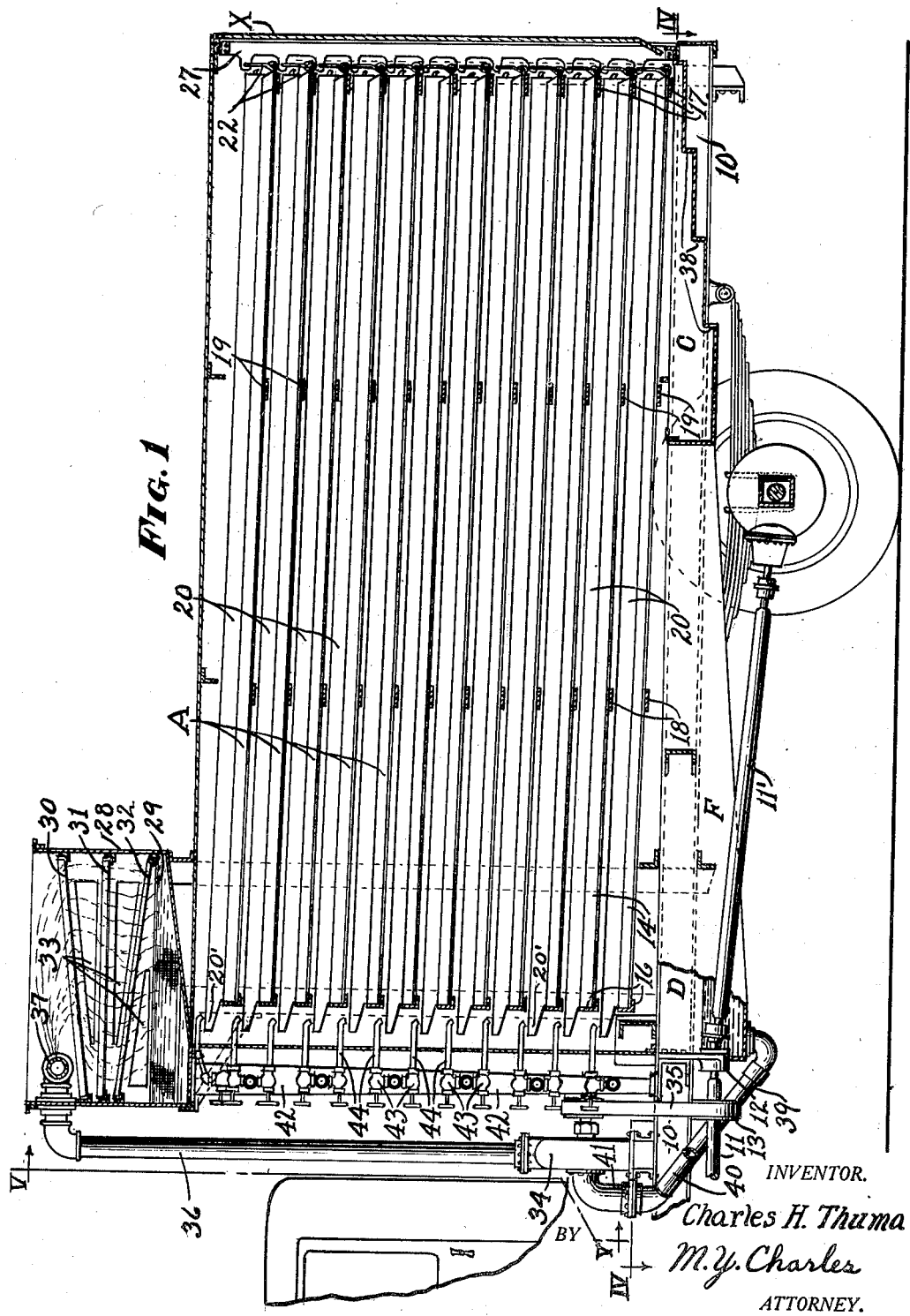

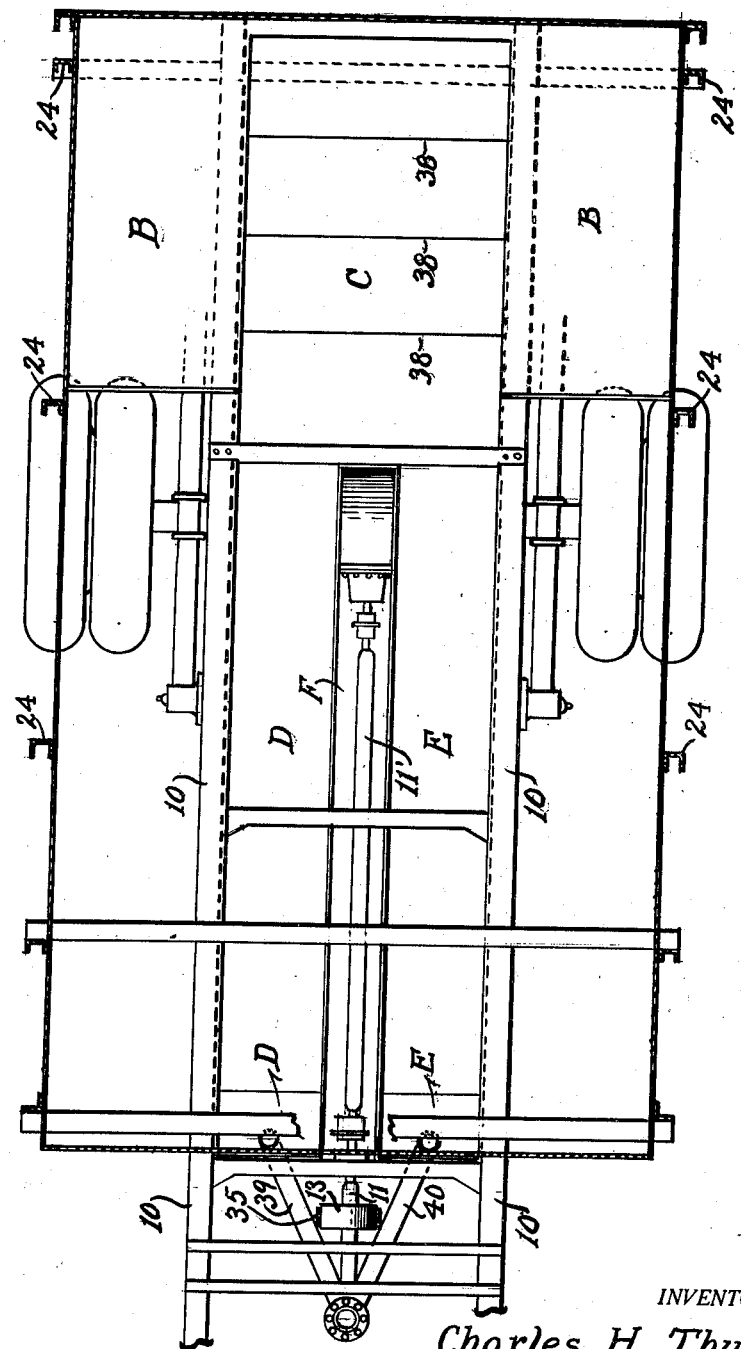

Aug. 31, 1937.  C. H. THUMA  2,091,695
DEVICE FOR TRANSPORTING LIVE FISH
Filed Feb. 1, 1935   5 Sheets-Sheet 4
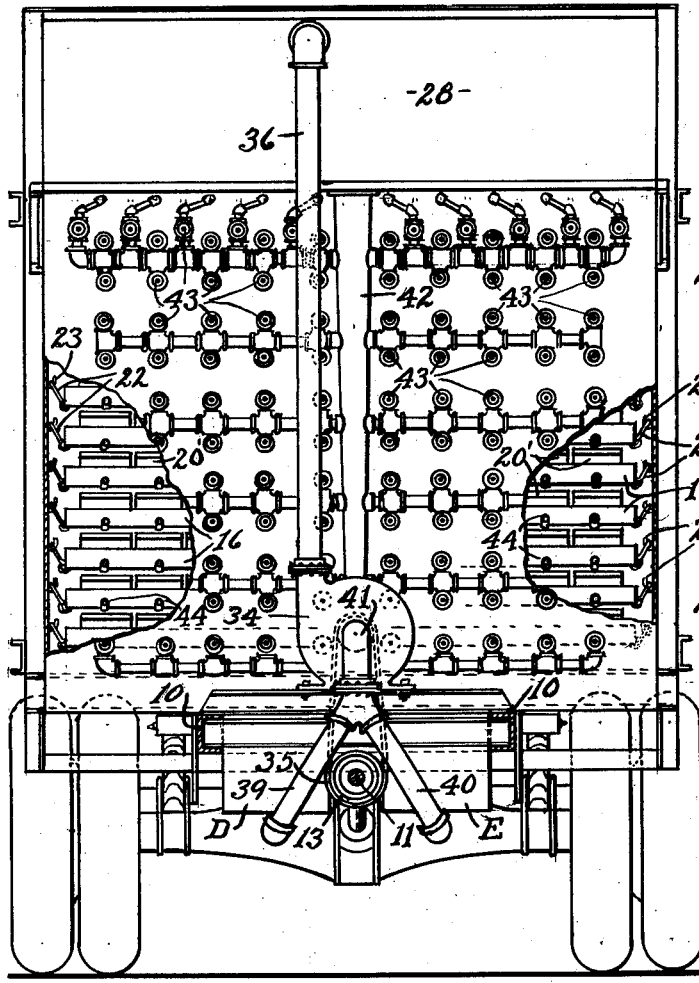
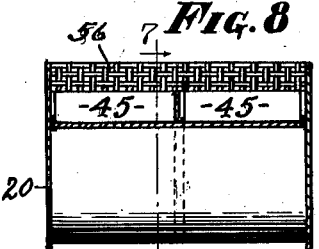
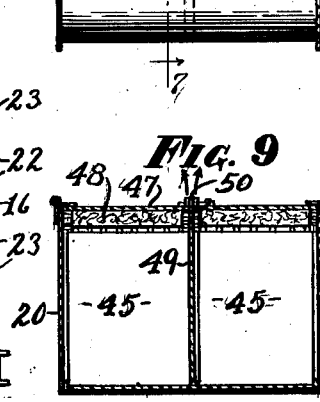
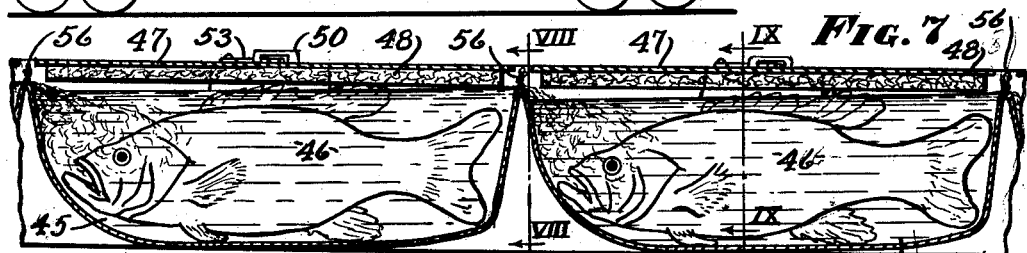
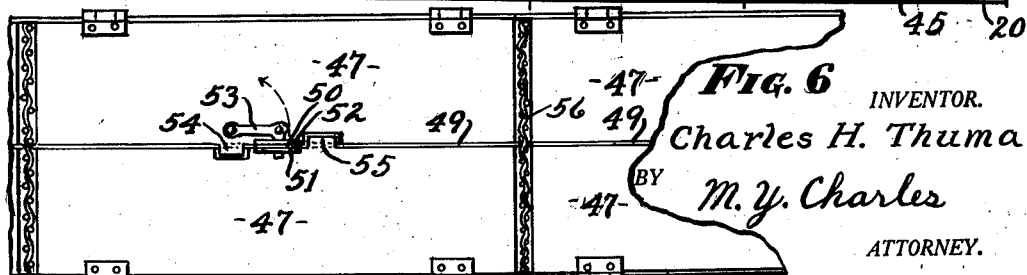
INVENTOR.
Charles H. Thuma
BY M. Y. Charles
ATTORNEY.

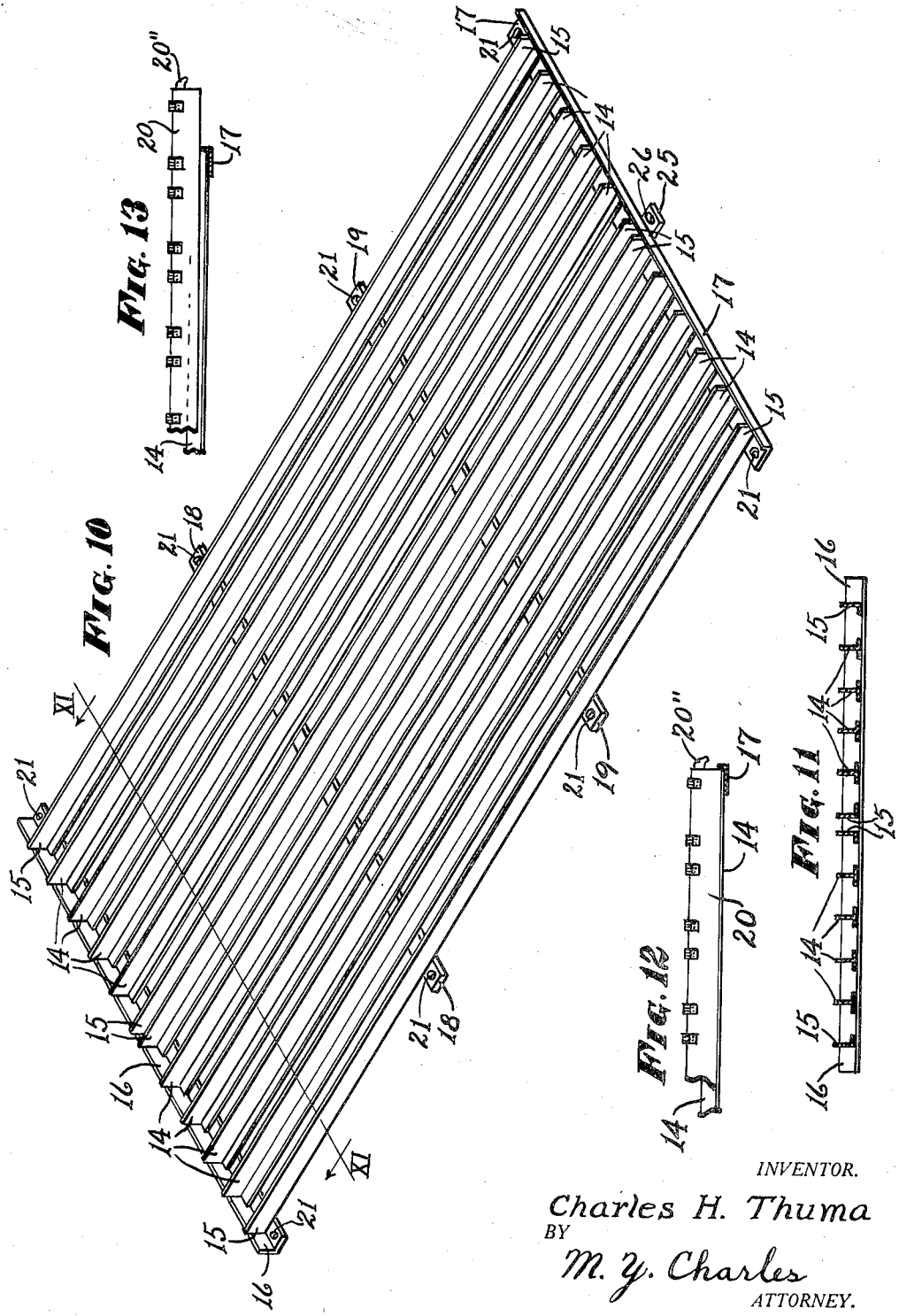

Patented Aug. 31, 1937

2,091,695

UNITED STATES PATENT OFFICE 2,091,695

DEVICE FOR TRANSPORTING LIVE FISH

Charles H. Thuma, Midian, Kans.

Application February 1, 1935, Serial No. 4,450

6 Claims. (Cl. 119—5)

This invention relates to a device for transporting live fish. The object of the invention is to provide a device for transporting a large number of live fish in a small amount of water. A still further object is to provide a device of the kind mentioned in which provision is made for aerating the water to keep it supplied with oxygen to sustain the fish. A still further object is to provide a device of the kind mentioned which may be applied to automobile trucks or freight cars or any other means of conveyance. These and other objects will be further explained as this description progresses.

Referring to the drawings in which like characters of reference refer to the same parts throughout the several figures. Fig. 1 is a longitudinal sectional view of my invention, taken on the line I—I of Fig. 2, showing it applied to an automobile truck. Fig. 2 is a plan view of Fig. 1, parts of which are broken away for convenience of illustration. Fig. 3 is a perspective view of one of the fish carrying trays. Fig. 4 is a sectional view as seen from the line IV—IV in Fig. 1. Fig. 5 is a view as seen from the line V—V in Fig. 1, parts being broken away for convenience of illustration. Fig. 6 is an enlarged detail plan view of a portion of the fish carrying trays. Fig. 7 is a longitudinal sectional view through Fig. 6, taken on the line 7—7 on Fig. 8. Fig. 8 is a sectional view as seen from the line VIII—VIII in Fig. 7. Fig. 9 is a sectional view as seen from the line IX—IX in Fig. 7. Fig. 10 is a perspective view of one of the racks which carry the fish carrying trays. Fig. 11 is a sectional view as seen from line XI—XI in Fig. 10. Fig. 12 is a side and sectional view of the fish carrying trays positioned in the tray rack, showing the method of retaining the tray in the rack. Fig. 13 is a side and sectional view of the fish carrying trays and tray rack showing the method of removing the trays from the racks.

In the drawings is shown an automobile truck having a frame 10, on which is carried the drive shaft 11, supported in the bearing 12 which is carried on the frame element 10. On the drive shaft 11 is mounted a pulley 13. At A is a plurality of carrying racks which are shown in Figs. 10 and 11 consisting of a plurality of T bars 14 and angle bars 15, the ends of which are supported on angle irons 16 and 17. At 18 and 19 are additional supporting members which are attached to the angles and T bars 14 and 15. The angle irons and T bars 14 and 15 are spaced apart so as to form a series of holders for the fish carrying trays 20. The trays 20 rest on the horizontal legs of the T bars and angles 14 and 15. The trays 20 are positioned between the T irons 14 and the angle irons 16 and 17, and to remove the trays from the rack the rear end of the tray may be lifted above the angle iron 17 and then slid rearward as illustrated in Fig. 13.

In the outer ends of the elements 16, 17, 18 and 19 are holes 21, in which are hooked one end of link elements 22, and the opposite ends of said link elements are carried on hooks 23. The hook elements 23 are supported on channel irons 24 of the frame work of the device, said frame work being carried on the frame proper 10 of the truck. At 25 is an outwardly extending lip rigidly attached to the element 17 and this lip is provided with a hole 26 to receive another supporting link 22, which is supported from a T shaped element 27 which is also carried on the frame work 10 of the truck. At X are shown doors hinged to the frame work of the body which are adapted to open and close for the purpose of loading and unloading the trays 20. At 28 is a tank having screen wire, or sheet metal, baffle plates 29 therein and a series of screens 30, 31 and 32 therein with air spaces 33 between said screens. In the side walls of the tank 28 are openings 33x. At 34 is a centrifugal water pump which is driven by the belt 35 on the pulley 13. The pump 34 discharges through the pipe 36 and the cross pipe 37 which is provided with a plurality of holes through which the discharge from the pump 34 is sprayed into the tank 28.

In Fig. 4 is shown the truck frame 10 on which is mounted a tank system B—B, C, C and E. The tank portions C are provided with steps 38 over which water may flow for aerating purposes. There is a space F between the tanks D and E to allow for the operations of the drive shaft 11'. At 39 and 40 are pipes connecting to the tanks D and E which join into the feed 41 of the pump 34. At 42 is a gravity feed pipe to a distributing system for the fish carrying trays. At 43 are shown valves to which water is supplied by gravity from the feed pipe 42, and from these valves are pipes 44 which feed water to the fish carrying trays as will later be described.

Now referring to the fish carrying trays 20. The trays comprise a series of compartments 45, shaped to conform to that of a fish 46 as nearly as is practical. Each compartment is provided with a lid 47 which is hinged to the sides of the tray, and on these lids 47 is attached any suitable porous material, such as felt or sponge 48 and the like. On the division 49 between the compartments 45 is an eye-like element 50, and at 51 and 52 are upturned eye-like elements on the covers 47 and at 53 is a hook which is adapted to pass through the eye-like elements, 52, 50 and 51, as a means of locking the covers 47 in a closed position. At 54 and 55 are outwardly extending lip like elements on the covers 47 which rest on the uper edge of the division 49 as a means of preventing the covers 47 from falling downward into the compartments 45.

Between the compartments 45 and at each end thereof, is a screen like element 56, through which water may flow as will later be described.

It will be noticed in Fig. 1, that the tanks A are set in an inclined position, inclining from the front to the rear, and the trays 20 being carried in said racks are also set in the same inclined position, therefore each successive point of division between the compartments is lower than the preceding division, therefore water entered at the tray in the front end will flow from each compartment to its following compartment as illustrated in Fig. 7. Attention is also drawn to the fact that water entering these compartments, enters in a falling position which causes the newly entering water to flow downwardly around the fishes' gills so that the fish may have the benefit of the supply of oxygen contained in the newly entering water. At the front end of the trays 20 is an outwardly extending trough like portion 20', which, when the tray is held in the rack A, is positioned under the discharge end of the pipes 44. At the opposite end of the tray 20 is a discharge spout 20''.

As shown in Fig. 3, each carrying tray has twenty-two compartments, however it will be understood that the number of compartments in these trays may be varied, therefore each tray is capable of carrying twenty-two fish as large as the trays will hold.

The operation of my device is as follows: The trays are filled with water and the fish placed in the compartments and the trays then placed in the racks as shown in Figs. 1, 2 and 3 and the valves 43 are opened so that water from the tank 28 flows into the troughs through the spout 20'' and falls into the tanks B, C and D, where it all eventually flows into the tank C and flows over the steps 38 into the tanks D and E, from where it is pumped through the pipes 40, by the pump 34, through the pipes 36 and 37 from where it is sprayed on the screen 30 and falls onto the screens 31 and 32, during which time it has been aerated or charged with oxygen from the air and has settled to the bottom of the tank 28, where it again flows through the pipe 42 and proceeds on the circuit through the trays 20 as described.

While the truck is running, the pump 34 is driven from the pulley 13 as previously described, however while the truck is standing still, the pump may be driven from any suitable auxiliary power, which is not shown, such as electric motors, small internal combustion engines, or the like.

Such modifications may be employed as lie within the scope of the appended claims, without departing from the spirit and intention of my invention. Now having fully described my invention, what I claim as new and desire to secure by Letters Patent is:

1. In a device for carrying live fish, a plurality of trays and means for supplying water thereto; each of said trays having compartments therein and a portion for receiving said water into said tray and a water discharge for each of said trays, an inclined rack, said trays being carried in said inclined rack, so that water will flow through said trays and compartments therein, and be discharged therefrom by gravity, and means for catching the discharging water from said trays and aerating the water and feeding it again to said trays for the purpose set forth.

2. In a device for carrying live fish, a plurality of trays, fish carrying compartments in said trays, means on said trays for receiving a flow of water, inclined means for causing said water to flow from one compartment to its succeeding compartment through said trays, means for discharging said water from said trays, said inclined means consisting of a plurality of racks, said racks being positioned one above the other and held in an inclined position, a plurality of said trays in each of said racks, and means for catching the discharge of said water from said trays, aerating said water and returning it to said trays, for the purpose set forth.

3. In a device for carrying live fish, the combination of a vehicle, carrying a plurality of inclined racks and a plurality of trays in each of said inclined racks, compartments in said trays, a portion on each of said trays for receiving water and delivering it to said compartments, a water discharge from said compartments and means for catching said water discharge and aerating the water and delivering the water to the water receiving portion of said trays.

4. In a device for carrying live fish, the combination of a power driven vehicle, a plurality of inclined racks carried on said vehicle and a plurality of fish carrying trays in each of said racks, means for carrying water below said inclined racks, a pump, said pump being driven by the motive power of said vehicle, a tank, said tank being positioned above said inclined racks and trays, screens in said tank, a discharge for said pump, said discharge being positioned within said tank and above said screens, a pipe connecting with the bottom of said tank so that water in said tank will flow by gravity into said pipe, laterals connecting to said pipe and valves connected to said laterals and a pipe leading from each of said valves, each of said pipes from said valves being so positioned so as to discharge water into the water receiving portion of its respective tray, and pipe connections between said pump and said means for carrying water, said pipe connections carrying water from the first water-carrying means to said pump.

5. In a device of the kind described for carrying live fish, trays in said device, each of said trays having a water receiving portion, a plurality of compartments in said trays, individual covers for each of said compartments, means for holding said covers in a closed position over said compartments, means for flowing water from each compartment to its succeeding compartment by gravity, and means for discharging the water from said trays at the opposite ends of the trays from where the water entered.

6. In a device of the kind described in claim 5, a porous material attached to the bottom of said covers, substantially as shown and described.

CHARLES H. THUMA.